United States Patent [19]
Kamimura et al.

[11] Patent Number: 5,260,540
[45] Date of Patent: Nov. 9, 1993

[54] METHOD OF IMPROVING QUALITIES OF MATERIALS AND WIRES USED THEREFOR

[75] Inventors: Tadashi Kamimura, Yokohama; Tadashi Tsujimura, Chigasaki, both of Japan

[73] Assignee: Isuzu Motor Limited, Tokyo, Japan

[21] Appl. No.: 645,932

[22] Filed: Jan. 25, 1991

[51] Int. Cl.⁵ .............................................. B23K 35/22
[52] U.S. Cl. ...................... 219/76.14; 219/137 WM; 219/146.31
[58] Field of Search ........... 219/145.22, 146.3, 146.31, 219/137 WM, 76.14, 137 R

[56] References Cited

U.S. PATENT DOCUMENTS

| | | | |
|---|---|---|---|
| 1,951,750 | 3/1934 | Cole | 219/146.31 |
| 2,003,020 | 5/1935 | Strobel | 219/146.31 |
| 2,785,285 | 3/1957 | Bernard | 219/146.31 |
| 3,147,362 | 9/1964 | Ramsey et al. | 219/146.3 |
| 3,999,036 | 12/1976 | Muratov et al. | 219/145.22 |
| 4,587,726 | 5/1986 | Homlgren | 219/145.22 |

FOREIGN PATENT DOCUMENTS 3743167 6/1989 Fed. Rep. of Germany .

*Primary Examiner*—Clifford C. Shaw
*Attorney, Agent, or Firm*—Dykema Gossett

[57] ABSTRACT

In a method of modifying qualities of materials at their local parts, the method comprises the steps of: making capsule particle by encapsulating a core particle with covering particles; making a wire by filling a sheath member with the capsule particle; and making weld cladding on the material whose qualities are to be modified with the wire.

31 Claims, 5 Drawing Sheets

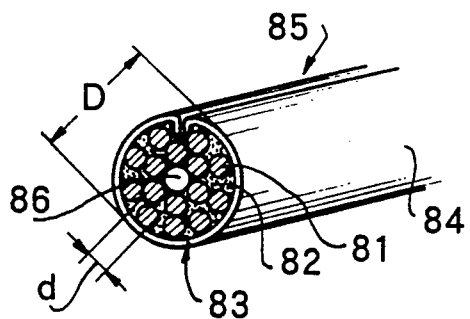
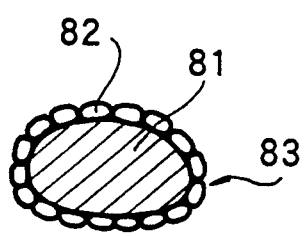
FIG. 22  FIG. 23
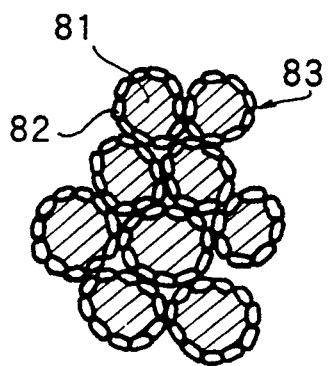
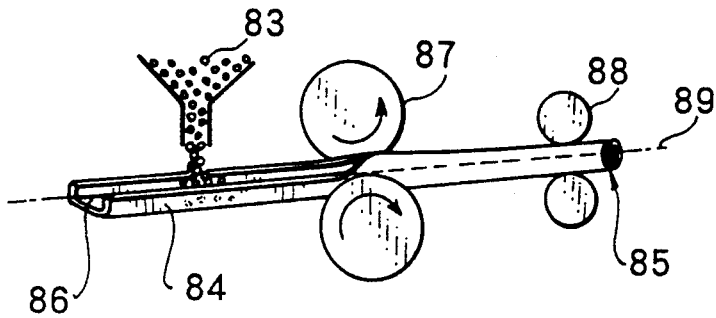
FIG. 24  FIG. 25
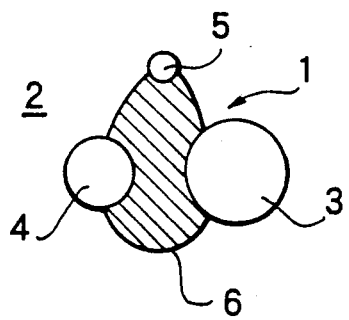
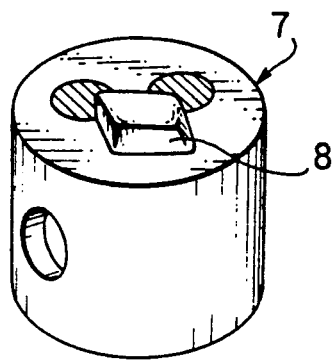
FIG. 26  FIG. 27

METHOD OF IMPROVING QUALITIES OF MATERIALS AND WIRES USED THEREFOR

BACKGROUND OF THE INVENTION

1. Technical Field

The present invention relates to a method of modifying qualities of materials such as metals and resins by a weld cladding method. The present invention also relates to welding wires used for the weld cladding method and a method of manufacturing such wires.

2. Background Art

Methods that can improve characteristics of a material by modifying its qualities at local parts thereof are in increasing demand in recent years. The automotive parts industry is focusing on, for example, thermal and mechanical loads against a cylinder head which increase as the engine output is raised. This raises a serious problem since the cylinder head is made from cast iron. Specifically, as shown in FIG. 26 of the accompanying drawings, the thermal cracks are apt to be generated in a bottom face 2 of the cylinder head 1, particularly at those parts which are thinner than other parts such as a part extending between an intake port 3 and an exhaust port 4 (called "inter valve part") and a part 6 surrounded by the ports 3 and 4 and a fuel injection nozzle opening (or a preheating chamber) 5. Therefore, the material of the cylinder head 1 should be strengthened at these local parts. In the case of a piston 7, as another example, parts surrounding a combustion chamber 8, particularly parts indicated by hatching in FIG. 27, need a strength-improvement treatment.

The following surface modification methods have been proposed to improve the strength of a local part of a material:

(1) Alloying: To improve a thermal resistance by adding an appropriate amount of heat-resisting alloying elements (e.g. Cr, Mo, Cu and/or Ni);

(2) Cast cladding: To form a cladding of steel or heat-resisting metallic material over the part liable to thermal cracking by means of casting; and (3) Nitriding: To form a nitride layer on the surface either in gas or liquid after machining.

If the part in question is of an aluminum alloy casting, the following methods are avilable in addition to (1) and (2):

(4) Precipitation toughening: To raise tensile strength as well as ductility by the precipitation toughening effect arising on addition of Sr or Ti in an appropriate amount;

(5) Hard alumite (or anodizing) treatment: To improve the thermal resistivity by forming a hard alumite film of about 100 micrometers on the surface;

(6) Remelting grain refinement: To improve the thermal resistivity by letting the aluminum matrix undergo a rapid melting-and-solidification with a high density energy such as laser, electron beam and TIG so as to refine the granular structure; and (7) Remelt alloying: To add heat-resisting elements (e.g. Ni, Cu, Cr and/or Mo) to the part melted in (6).

These methods, however, have following problems:

(1) Alloying: In addition to an obvious rise in cost, the castability is degraded on addition of the alloying element, which results in casting defects such as shrinkage, and aggravation of productivity and yield. Further, it is often the case that the alloying does not improve the thermal resistivity but deteriorates the thermal resistivity because of the generation of microshrinkage;

(2) Casting cladding: Because of the added care needed for oxidation prevention and casting temperature control during the casting, and the nondestructive testing afterwards, all of which are absolutely necessary to ensure satisfactory cladding, the increase in cost is enormous; and (3) Nitriding: In addition to the obvious increase in cost, the high temperature of nitriding (560° to 580° C.), to which the machine part should be exposed entirely, often gives rise to deformation of internal cracking. Further, in order to perform the nitriding to perfection, the graphite in the cast iron should be removed.

Another proposal is to spray coat the part concerned here (the bottom face of the cylinder head) with a ceramic or a heat-resisting material. Since the spray coated layers are so liable to early separation, however, this method has not been implemented.

For the methods relating to aluminum castings, on the other hand, there are the following drawbacks:

(4) Precipitation toughening: Although this approach is simple enough to practice the benefit is small;

(5) Hard alumite treatment: Although the effect of improving the heat resistivity is greater than the methods (1) and (4), an application of alumite film to only the concerned part is costly because all other parts must then be protected from being converted into alumite;

(6) Remelting grain refinement: Though the operation is simple and the effect is comparatively large, the improvement obtainable is not large enough for the target demanded today;

(7) Remelt alloying: Though this method is basically more promising than the method (6), the formation of a sound (i. e., free of defects and of post-treatment crackings) remelting-alloyed layer is difficult. In addition, the content of alloying element must be held to less than 10 to 20% to prevent alloying element must be held to less than 10 to 20% to prevent these defects. Therefore, a remarkable improvement cannot be expected in the heat resistivity.

Moreover, there is another aspect of automotive parts that should be taken into consideration: For weight reduction, polymers (i.e., resins) are used more and more not only for coverings, inner panels and the like but also for outer panels and even for structural members.

Now, to overcome the deficiencies inherent with the conventional methods (1) to (3), there has been proposed a method to apply the weld cladding of heat-resisting metal (e. g., Co, Ni and Mo) to the parts that are liable to thermal cracking such as the bottom face of the cylinder head. The problem here has been the precipitation of cementite ($Fe_3C$) at the boundary between the base metal (cast iron) and the cladding heat-resisting metal, because the cementite is not only brittle but aggravates machinability. Also, the cladding of heat-resisting metal itself is liable to cracking during weld cladding.

A method similar to the above-described weld cladding has also been proposed for aluminum alloy castings to avoid the deficiencies of the conventional methods (1), (2) and (4) to (7). Here, because of the liability of in- and post-weld cladding, cracking, as in the method (7), the content of added alloying element cannot be raised sufficiently and the desired heat resistivity will not be obtained.

As for the resins, there are many problems, too. For example, when a resin is used for a structure member of an automobile, what is needed beside the strength is wear resistivity. Although the resins generally possess a high wear resistivity against contact with metals, they are apt to undergo plastic deformation if the contact load between the resin and the metal is large. This causes seizing and wear. To improve the rigidity and wear resistance of such a resin at its contact plane, a method of weld cladding it with a hard plastic using ultrasonic has been proposed. However, mere cladding of resin with hard plastic does not improve the characteristics. In addition, an increase in the elastic modulus, which is the most desired factor in preventing the plastic deformation under a heavy load, is scant. Therefore, this method hardly contributes to improvement of the wear resistance of the resin concerned.

As another example, the resins are used in the automobiles as housings of various onboard sensors and electronic controllers. In these applications, electrically conductive plastics are used to protect the components from electromagnetic waves and from trouble relating to electric waves.

An electronic instrument is often desired to be attached to an existing instrument. In this case, the former instrument may be mounted on a housing of the latter instrument, and a vibration analysis must be conducted since the vibrations affect the electronic instrument, but antivibration measures for the combined instruments require a great amount of expense and labor even if adequate vibration-damping measures are given to the individual instruments. A simple way of solving this problem is to place a rubber material between the instruments. But, since such the material does not accept paint or reflects differently as compared with the instruments next thereto, the appearance of the product is not pleasant and the value as a merchandise is lowered.

SUMMARY OF THE INVENTION

An object of the present invention is to provide a method of improving qualities of a material (referred to as "material improvement or material modification") to be applied to parts made of cast iron in such a way as to give rise to neither embrittlement nor degradation of machinability due to precipitation of cementite, and also provide a welding wire (called "wire" or "material modification wire") to be used therefor.

Another object of the present invention is to provide a material modification method to be applied to parts made of cast aluminum alloy in such a way as to give rise to a large increase in the heat resistivity but not to cracking, and also to provide a wire to be used therefor.

Still another object of the present invention is to provide a material modification method that is able to endow the resins with rubber-like properties without changing the surface skin thereof, an also to provide a wire to be used therefor.

Yet another object of the present invention is to provide a method of modifying or improving the qualities of material and at the same time raising the elastic modulus greatly, and to provide a wire used therefor.

Another object of the present invention is to provide a method of improving qualities of the above-mentioned wires.

Another object of the present invention is to provide a wire used in weld cladding which ensures a smooth and/or uniform welding current flow and a high quality welding when the above-mentioned material modification methods are carried out by a padding or weld cladding with a MIG welder or the like.

According to one aspect of the present invention, there is provided a method of modifying the qualities of various materials (called "object material") at their local parts, which comprises the steps of: manufacturing miniature capsules (called "capsule particles") including a particle that functions as a nucleus (called "core particle") and particles that cover the core particle so as to encapsulate it (called "covering particles"); manufacturing a wire by filling a sheath member with the capsule particles; and weld cladding the object material using the wire thus manufacture.

Among these steps, the capsule particle preparation step may include two sub-steps: In a first sub-step, the core particles are respectively covered with a great number of covering particle, whose diameter is smaller (called "smaller particles") than the core particle, by electrostatically attaching them onto the respective core particles. In a second sub-step, these intermediate capsule particles are thrown into a high speed gas stream so that they are subjected to an impact force, by which the covering particles firmly adhere on the intermediate capsule particles, whereby the capsule particles are formed.

The wire preparation step may also include two sub-steps: In a first sub-step, a pipe or a tubing is filled with the capsule particles, and in a second sub-step, the pipe thus loaded with the capsule particles is drawn to a wire of predetermined diameter.

Further, the weld cladding step may be carried out by a welding using the wire of the present invention as a filler. In this case, a MIG welder may be used and the wire of the present invention is preferably used as a consumable electrode.

According to another aspect of the present invention, there is provided a wire comprising: a plurality of capsule particles, each made by encapsulating a core particle with smaller covering particles; and a sheath member, which is to be filled with the capsule particles. Here, it is preferred that both the covering particle and the sheath member be electric conductors, that they be made of a material that is compatible with the object material, and moreover, that they be made of a material that is of the same kind as the object material. It is also preferred that one wire that is deemed most appropriate be used in the weld cladding for the purported material modification.

The core particle in the wire may be a heat resisting element, and the covering particle and the sheath member be a metal, wherein the heat resisting element may be a heat resisting metal such as Co, Mo, Cr and Ni, or a ceramic such as $Al_2O_3$, $Si_3N_4$, SiC and CuO. For example, the core may be of a particle of any of Co, Mo or Cr, and the metal for the covering particle and sheath member may be Cu. The material modification method by performing the weld cladding on the cast-iron castings using this wire would be recommended.

The wire may be of a core particle made of a heat resisting element, and a covering particle and a sheath member made of Al. Alternatively, the wire may be a combination of a ceramic used for the core particle, and a polymer used for the covering particles and the sheath member. It is preferred here that, in the above-described capsule particle, the volume ratio of the core particle be larger than the volume ratio of the covering particles. In addition, the core particle may be rubber, and the covering particle and the sheath member be a polymer. In this case, the polymer may be a resin. The material modification by weld cladding a polymer or a resin using an appropriate one of these wires is preferred. In such a case, the weld cladding may be performed by the ultrasonic welding method.

According to another aspect of the present invention, there is provided a method of manufacturing these wires, which comprises the steps of: rendering the material for the sheath member into a plate-like flat form; preparing a capsule particle by encapsulating a core particle, made of a heat resisting element, with smaller covering particles; letting the capsule particles attach to or adhere on a surface of the sheath member material mentioned above, i.e., that surface which becomes inside when it is formed into a sheath (called "inside surface"); and allowing the sheath member material (now carrying the capsule particles) to be rolled into a form of wire. Here, the capsule-particle-adhering-on-the-inside-surface-of-the-sheath-member-material step may be carried out by ultrasonic vibration energy generated by an ultrasonic transducer or by ohmic resistance heat generated by an ohmic resistance sintering apparatus.

According to another aspect of the present invention, there is provided a wire improved over a wire used in the quality modification of various materials at their local parts by weld cladding using a MIG welder or the like. The wire may include: capsule particles, each made by encapsulating a core particle with smaller covering particles; a wire made from an electrically conductive sheath member that contains these capsule particles; and another wire that has an electric resistance comparable to the sheath member and is inserted thereinto so as to be surrounded by the capsule particles. Here, it is preferable to form the second wire from the same kind of material as the sheath member.

As for the wire described above, furthermore, it is preferable that the covering particles and the sheath member be made of a material that is compatible with the object base metal, that the second wire thereof be made of the same kind of material as that of the covering particle and the sheath material, that the second wire be laid along the central axis of the wire, that the second wire be of a diameter one tenth to one half that of the wire, and that the diameter of the covering particle be about one tenth that of the core particle. Here, the outer diameter of the wire may be, for example, be 0.8 mm to 1.6 mm. The weight ratio of the covering particles to the core particles may be 30 to 70 (30:70) in a capsule particle. The diameter of the core particle may be 10 to 500 micrometers or thereabout.

The present invention, being as described above, exhibits following remarkable advantages in comparison with the conventional material-modification-by-weld-cladding methods:

(a) It is possible to carry such alloying elements that cannot be formed into wire, into the weld cladding;

(b) Since the electric current within the wire has been made uniform, the welding quality is stabilized;

(c) It is possible to carry such alloying elements that are not compatible with the object base metal, into the weld cladding; and (d) By appropriately selecting the material combination between the capsule particle and the sheath member, it is possible to apply the weld cladding to any materials.

Here, particularly with respect to (b), the above-mentioned wire manufacturing method and the wire having the second wire therein would be recommended to be used.

BRIEF DESCRIPTION OF THE DRAWINGS

FIG. 22 shows in oblique view a wire to be used in the material modification according to a sixth embodiment of the present invention;

FIG. 23 shows a sectional view of a capsule particle to be used in the sixth embodiment;

FIG. 24 shows a composite particle that is an agglomerate of the capsule particles;

FIG. 25 illustrates in oblique view a step of making the wire of the present invention;

FIG. 26 shows a bottom of a cylinder head and used to explain a conventional method; and FIG. 27 shows a perspective view of a piston for the same purpose as FIG. 26.

DESCRIPTION OF THE PREFERRED EMBODIMENTS

Now, preferred embodiments of the present invention will be explained with reference to the accompanying drawings.

First Embodiment

FIGS. 1 to 8 illustrate a first embodiment of the present invention for modifying qualities of materials and a wire to be used therein. A weld cladding for a cast iron casting is performed using a wire including a plural number of capsule particles, each made by encapsulating a core particle made of a heat resisting element with smaller covering metallic particles (the individual particles are smaller than the core particle) over the core particle, and a sheath member made of a metal and filled with the capsule particles.

Figure 1:
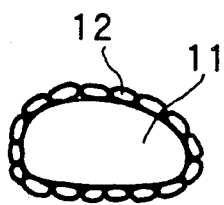
FIG. 1 shows a capsule particle preparation step pertaining to a first embodiment of the present invention for a method of modifying qualities of materials and a wire to be used therefor, wherein covering particles are attached to a core particle.
Figure 2:
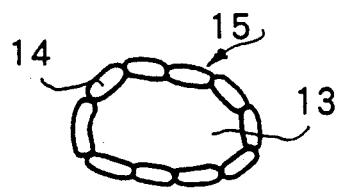
FIG. 2 shows the capsule particle in its cross section.
Figure 3:
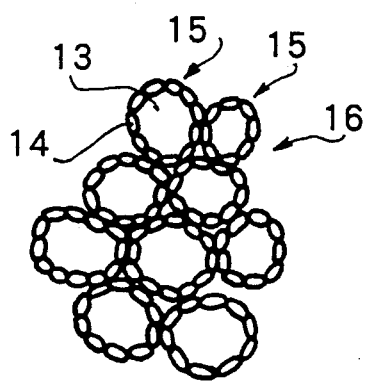
FIG. 3 shows a composite particle that is an agglomerate of the capsule particle shown in FIG. 2.

To explain the process of making the wire to be used in the method and the structure of the wire, Co is used as a heat resisting element, and metallic Cu particles 12 of a diameter about one tenth that of the Co particle 11 are applied onto the Co particle 11 of a diameter 10 to 500 micrometers or thereabout, as shown in FIG. 1. Here, van der Waals force is used for the attaching operation. Then, an appropriate impact force is applied on the Co particles 11, now attached with the Cu particles 12. Owing to this impact force, the Cu particles 12 firmly adhere on the mother (or the core) Co particle 11, covering the latter, so that capsule particles 15, each composed of a Co core particle 13 and the Cu covering particles 14, are formed as shown in FIG. 2. By agglomerating these capsule particles 15 in a great number, moreover, the composite particle 16 are formed as shown in FIG. 3.

Figure 4:
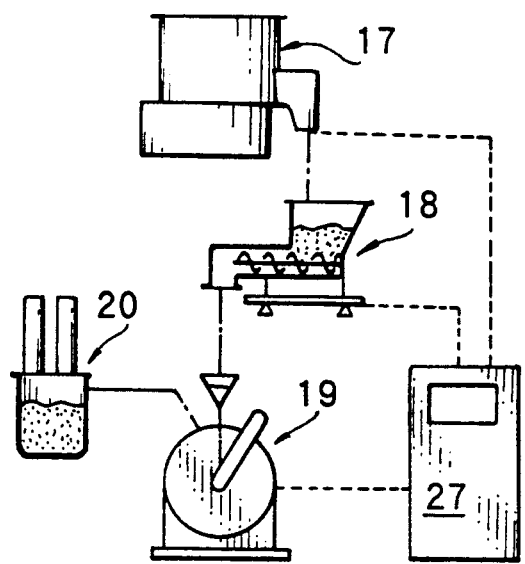
FIG. 4 shows a system diagram of an equipment for manufacturing the capsule particles.

FIG. 4 illustrates a system diagram of equipment for manufacturing the composite particles 16, which are agglomerates of the capsule particles 15. In this case, the equipment is used to manufacture the capsule particles 15 dry, or in the dry process, so that the equipment comprises an electrostatic treatment unit 17 in which the particles are covered with smaller particles, a feeder 18 through which the particles as covered with smaller particles are transferred at a predetermined rate, a roll forming machine (called "hybridizer") 19 in which an impact force is applied to these particles, and a collector-cum-container 20 in which the composite particles 16 thus manufactured are to be stored. In addition, a controller 21 is provided for controlling actions of the units 17, 18 and 19.

Figure 5:
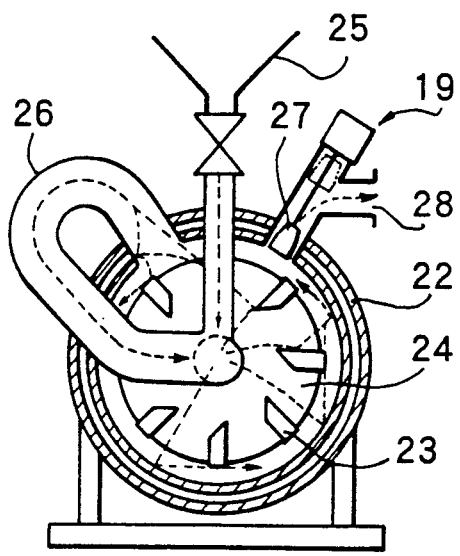
FIG. 5 illustrates a roll forming machine (called "hybridizer") of the equipment of FIG. 4.
Figure 6:
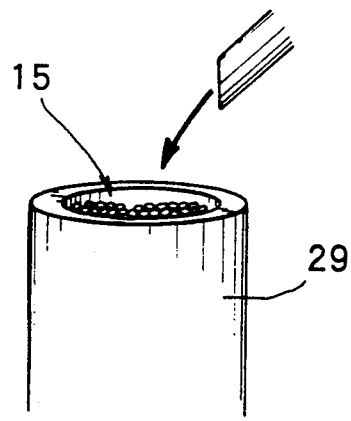
FIG. 6 illustrates in oblique view a step of filling a sheath member with the capsule particles of FIG. 3.

Now, referring to FIG. 5, the hybridizer 19 is equipped with a rotor 24 having a number of blades 23. The rotor 24 is rotatably mounted on the stator 22. Thus, the particles are not only flung away by the centrifugal force from the center as they enter the machine through a feeding port 25 to be subjected to an impact force, but are returned many times over to a high speed gas stream existing inside the hybridizer, through a recirculation duct 26. They are discharged out of the hybridizer 19, whenever the discharge valve 27 is opened, via a discharge port 28.

The Co particles 11 and the Cu particles 12, as mutually adhered on each other, are fed into the hybridizer 19, and subjected to the impact force for 1 to 10 minutes in the high speed gas stream, with the rotor 24 rotating at a revolution speed of 8,000 to 16,000 rpm. In this manner, which is referred to as "high speed gas stream and impact method", the capsule particles 15 firmly adhere on each other and they are called the composite particles 16. Other known methods of making the capsule particles 15 than the high speed gas stream and impact force method are also satisfactory. These methods are, for example, a sputtering method, a wet method, a replacing plating method, a non-electrolysis plating method, a CVD method, a vacuum deposition method, an alkoxide method, a coprecipitation method, a coprecipitation-and-reduction method and a Shervitt method.

Figure 7:
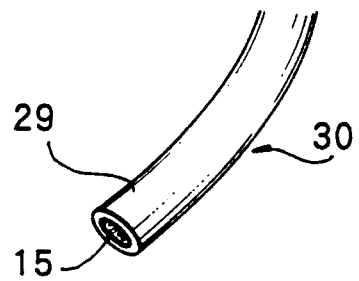
FIG. 7 shows in oblique view a wire made from the sheath member of FIG. 6.

After that, a piece of Cu strip is changed to a pipe or a tubing 29. A cavity of the Cu strip is filled with the capsule particles 15 after they have been formed with zinc stearate or the like agent as a binder. Then, the pipe 29 is drawn, as filled with the capsule particles 15, into a fine wire (i.e., the welding wire) 30 of a diameter of 0.8 to 1.6 mm as shown in FIG. 7. This wire 30, which is to be used in the material modification, constitutes one of the features of the present invention. The manufacture of the wire 30 may be done in a manner similar to a known method of manufacturing a flux-cored wire.

Figure 8:
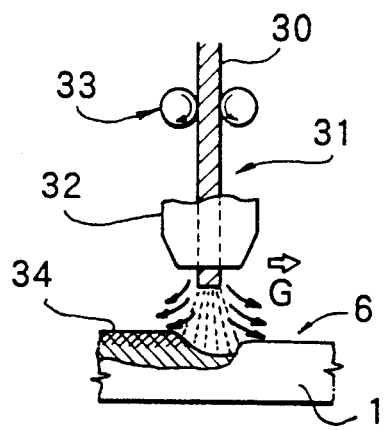
FIG. 8 shows in lateral view a welder for conducting a weld cladding.

The wire 30 is set to a welder 31 that performs a MIG welding as shown in FIG. 8. The welder 31 is equipped with a nozzle 32 to supply shield gas G and a wire feeder 33 to supply the wire 30 progressively so as to conduct an arc welding with the wire 30 as a consumable electrode. Here, the weld cladding is performed with the wire 30 as the filler by moving the welder 31 along the object part 6 of a cylinder head 1, which is made of a cast iron casing, so that the object part 6, which needs strengthening, may be covered with a molten metal layer 34 now added with Co. Thereafter, the part is machined to a finished cylinder head 1.

As described above, by forming the wire 30 through filling the Cu pipe 29 with the capsule particles 15, which are made by encapsulating Co core particles 13 with the Cu covering particles 14, and by forming the weld cladding on the object part 6 of the cast iron casting, what is achieved is, owing to Co, not only a substantial increase in the thermal resistance at the desired local part of the cylinder head 1 which needs strengthening, but an effective prevention of precipitation of cementite and embrittlement due thereto. That is to say, since Co is surrounded by Cu, it does not undergo direct contact with the cast iron, and since the cementite hardly precipitates, very little if ever, in the molten metal layer 34, which has been thus alloyed, neither embrittlement nor degradation of machinability due to the weld cladding ensues.

Further, since Co is distributed evenly in the molten metal layer 34 as existing within the Cu matrix in the form of a fine particle and since Cu is highly compatible with the cast iron, a factor that often causes crackings if the weld cladding is performed using a heat resisting metal alone is relaxed, so that a refinement layer containing no weld defects can be formed. Another benefit of this invention here is that, since the wire 30 has been made by filling it up with a plural number of capsule particles 15, the electric resistance during welding is rendered uniform. This will be understood if one considers the difficulty associated with forming a uniform mixture of particles of a heat resisting element and Cu particles: because of the unevenness that ensures thereby, the distribution of electric resistance becomes uneven along the wire length, making the stable weld cladding extremely difficult. This invention prevents these difficulties.

The beneficial effects of this invention were confirmed in an experiment for a cast iron (JIS FC25) conducted under following conditions:

Welding wire: 1.5 mm in outer diameter, made from a pure copper strip of thickness of 0.15 mm.

Capsule particles (covering particles/core particle): Cu/Co, Cu/Mo or Cu/Cr, each 30/70% in weight ratio.

Welding condition: 160 A and 23 kV.

The result of the experiment showed us that when the weld cladding was conducted using any of pure Mo, Co-alloy (Stellite No. 12) and Cr-alloy (SUS 309), extensive cracking occurred in the weld metal, whereas that when the wire 30 of this invention was used, no cracking occurred and formed was a sound weldment with a defect-free cladding.

Here, not only many combinations other than those based on Co, Mo and Cr mentioned above are possible, but the use of other heat resisting metals or ceramics such as $Al_2O_3$, SiC, $Si_3N_4$ and CuO as the heating resisting element is permissible. As for the cross section of the wire 30, moreover, that shown in FIG. 7 is not a necessary one, but any other form such as those used in making the flux-cored wires can be used as long as it is able to retain the capsule particles 15. In addition, the method of weld cladding is not limited to MIG, but any of the wire methods of welding, for example TIG, can be used equally well.

Second Embodiment

In a second embodiment of the present invention, we conduct the weld cladding for aluminum alloy castings such as a cylinder head, using a wire composed of plural number of capsule particles, each made by encapsulating a heat resisting element as the core particle with smaller covering particles, and a sheath member made of Al which is filled with the capsule particles.

Figure 9:
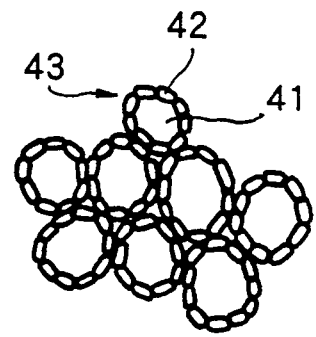
FIG. 9 shows a capsule particle in cross section pertaining to a second embodiment of the present invention.

The wire is made similarly as in the first embodiment: for example, first, we take Mo particles of a diameter of 10 to 500 micrometers as the core particle, and let Al particles of a diameter of about one tenth of the former electrostatically adhere thereon, and subject them to the high speed gas stream and impact treatment so as to make the Al particles penetrate into the Mo particle, thereby producing the capsule particles 43 composed of Mo core particle 41 and Al covering particles 42, as shown in FIG. 9. Second, we take a strip of Al, make a pipe out of it, fill it with the capsule particles 43, draw the pipe as filled with the capsule particles 43 into a fine wire, thereby producing a welding wire of a diameter of 0.8 to 1.6 mm. Third, we set this wire to the MIG welder mentioned above (FIG. 8), move the welder along the surface of the object part, and conduct the weld cladding thereon with the wire described above as the filler, thereby forming a molten metal layer now added with Mo.

Since the object part is now covered with the weld cladding, which has been made with a wire of the present invention as the filler (the wire comprises the capsule particles 43, each made of a Mo particle as the core particle 41 and Al particles as the covering particle 42, and an Al pipe filled with these capsule particles 43), the cylinder head has been improved greatly in the heat resistivity at its local object part, so that occurrence of cracks during and after welding has been effectively prevented. Namely, since Mo is distributed in the molten metal layer evenly existing within the Al matrix in the form of fine particles and since the Al matrix is of the same kind as the Al alloy casting, the factor that causes cracking if the weld cladding were conducted with a heat resisting element alone has been removed, so that a sound (i.e., free of weld defects) reinforcement layer is obtained. This means further that by changing the diameter of the heat resisting element appropriately in the capsule particle 43, i.e., by selecting the diameter ratio of the core particle 41 to the Al covering particles 42 properly, the content of the heat resisting element to be added can be controlled as desired, thereby relaxing greatly the limit imposed on the content of the additive heat resisting element in the conventional removal alloying treatment method.

Further, the same benefit of homogenizing the electric resistance during welding is realized as in the first embodiment.

We confirmed the beneficial effects of this invention in an experiment conducted for an Al alloy casting (JIS AC2B) under following conditions:

welding wire: 1.2 mm in outer diameter, made from a pure aluminum strip of thickness of 0.15 mm.

Capsule particles (covering particle/core particle): Al/Co, Al/Mo or Al/Cr, each 30/70% in weight ratio.

Welding condition: 170 A and 25 kV.

The result of this experiment shows us that when the weld cladding was conducted using any of pure Mo, Co-alloy (Stellite No. 12) and Cr-alloy (SUS 309), extensive cracking occurred in the weld metal, whereas that when the wire of the present invention was used, no cracking occurred, thereby forming an adequate weldment and a defect-free cladding.

Here, as in the case of the first embodiment, not only many combinations other than those based on Co, Mo and Cr mentioned above are admissible, but the use of other heat resisting metals or ceramics such as $Al_2O_3$, SiC, $Si_3N_4$ and CuO is permissible for the heat resisting element.

Third Embodiment

In a third embodiment, we conduct the weld cladding for polymers, using a wire composed of plural number of capsule particles, each made by encapsulating a core particle of either metal or ceramic with covering particles made of a polymer, and a sheath member made of a polymer which is to be filled with these capsule particles. Here, the methods of manufacturing the capsule particles and the wire may be the same as in the foregoing two embodiments.

Figure 10:
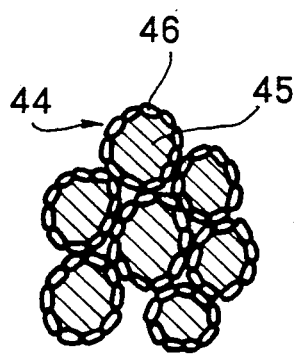
FIG. 10 shows a capsule particle in cross section pertaining to a third embodiment of the present invention.

Referring to FIG. 10, we take a metal (or ceramic) particle of a diameter of about 10 to about 500 micrometers as the core particle 45, and make a capsule particle 44 by encapsulating it with the covering particles 46 made of a resin such that a volume ratio of the core particle 45 to the covering particles 46 be about 70 to 30. Here, the volume ratio can be set as desired in accordance with the end purposes, because the difficulties associated with uniformly mixing resin particles and metal or ceramic particles so as to make the latter more than 50% has been eliminated by using the capsule particle 44. As for the resin, a plastic may be selected in consideration of the base object material and the compatibility thereto from known plastic, including acrylic resins, fluoride types (PFA), vinylidene fluorides, benzoguanamines, silicones, epoxies and nylons.

Then, we fill a pipe, made of a resin of the same kind as the covering particle 46, with the capsule particles 44 thus made, and heat and drawn it into a fine wire of a diameter of 1 to 5 mm or thereabout (not shown). The cladding with this wire can be conducted by the direct welding method or by the ultrasonic welding method to obtain a structure member made of polymer. Since the ultrasonic welding proceeds by the exothermic reaction of the polymer itself, the provision of uniform particle mixture by virtue of the use of the capsule particles 44 ensures uniform heating, hence high quality material modification. Here, it is to be noted that since the practice of the third embodiment ensures the admission of metal or ceramic in a quantity markedly greater than considered possible hitherto, not only the anti-wear resistance of structural members made of polymer or resin is greatly improved but their elastic moduli are also increased greatly, so that the plastic deformation that is apt to occur in the planes sliding under a large load is effectively prevented.

Figure 11:
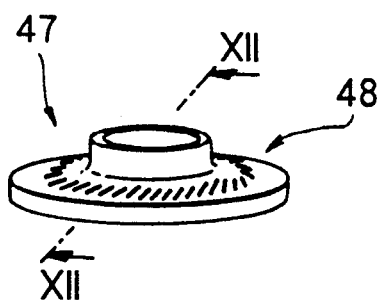
FIG. 11 shows in oblique view an engine valve retainer as an object article of the present invention.
Figure 12:
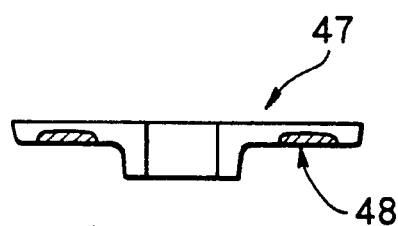
FIG. 12 shows a cross section of the engine valve retainer of FIG. 11 as taken along the line XII—XII.

We have provided FIGS. 11 and 12 as an example: An engine valve retainer 47 was made from a polymer for the sake of weight reduction, but was found to wear excessively at the part 48 where the spring made constant contact, and we have applied a weld cladding by the third embodiment method described above to the part 48 and obtained a satisfactory wear resistance therefor. As may be imagined from this practical example, the present invention is effective to improve the elasticity and the anti-wear resistivity of such object parts as the resin seal packing plane and the resin gear meshing face.

Fourth Embodiment

In a fourth embodiment, we conduct the weld cladding for polymers using a wire composed of plural number of capsule particles, each made by encapsulating a core particle of rubber with the covering particles made of a polymer, and a sheath member made of polymer which is filled with these capsule particles. Here, the methods of making the capsule particles and the wire may be the same in the foregoing three embodiments.

Figure 13:
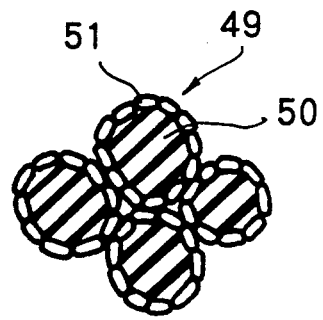
FIG. 13 depicts a capsule particle in its cross section pertaining to a fourth embodiment of the present invention.

Referring to FIG. 13, we take a rubber particle of a diameter of 10 to 500 micrometers or thereabout as the core particle 50, and make a capsule particle 49 by encapsulating it with the covering particles 51 of a resin so that the weight ratio of the core particle 50 to the covering particles 51 be about 70:30. Here, the weight ratio can be set as desired in accordance with the end purposes as described earlier on, and the rubber core particle 50 which may be selected from known rubbers such as natural rubber (NR), styrene rubber (SBR), butadiene rubber (BR), chloroprene rubber (CCR), nitryl rubber (NBR) and fluoride rubber (FPM) appropriately in consideration of the shock-absorbing characteristics desired, can be made easily by a freeze granulation method to be conducted in liquid nitrogen or dry ice. As for the resin, a plastic may be selected as in the third embodiment in consideration of the base object material and the compatibility thereto from known plastics, including acrylic resins, fluoride types (PFA), vinylidene fluorides, benzoguanamines, silicones, epoxies and nylons.

Then, we fill a pipe made of a resin of the same kind as the covering particle 51 with the capsule particles 49 thus made, and heat and draw it into a fine wire of a diameter of 1 to 5 mm or thereabout (not shown). The cladding with this wire can be conducted for articles made of polymer by the ultrasonic welding method or other suitable methods.

Figure 14:
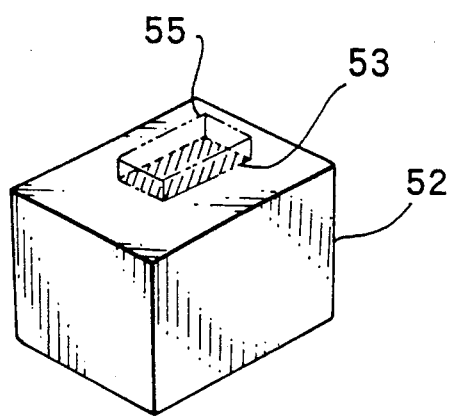
FIG. 14 depicts in oblique view a housing made of a resin to contain an electronic instrument as an object article of the present invention.
Figure 15:
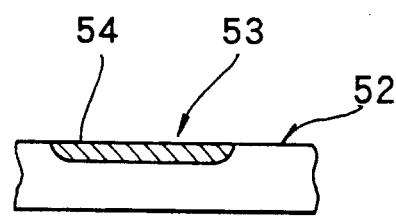
FIG. 15 shows pertinent parts of the housing of FIG. 14 in its cross section.

The weld cladding thus formed not only has a resin surface but possesses shock-absorbing properties by the virtue of the rubber component. That is to say, as shown in FIGS. 14 and 15, by performing the weld cladding using the wire of this embodiment on the object part 53 of an existing resing housing 52, a quality-modified layer 54 can be formed to act as the shock-absorber for the newly attached instrument 55, thus contributing to vibration control of the composite instrument housing as a whole and preventing the degradation of merchandise value by forestalling the occurrence of different hue when painted.

Fifth Embodiment

Figure 16:
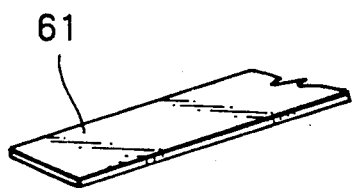
FIG. 16 illustrates a step of rendering the material for the sheath member into a plate-like flat form in making the wire to be used in the material modification according to a fifth embodiment of the present invention.

In a fifth embodiment shown in FIGS. 16 to 21, we provide a method of making a wire that is yet improved over those of the foregoing embodiments in qualities. Namely, in FIGS. 6 and 7, there is shown a method in which the pipe 29 of large diameter which is to become the sheath member is drawn into the fine wire after it has been filled up with the capsule particles 15, but filling the pipe 29 with the capsule particles 15 is no easy task. To overcome this difficulty, we first render the material for the sheath member 61 into a flat plate-like form of a given width as shown in FIG. 16, where the material for the sheath member 61 is an electric conductor, say, a strip of copper.

Figure 17:
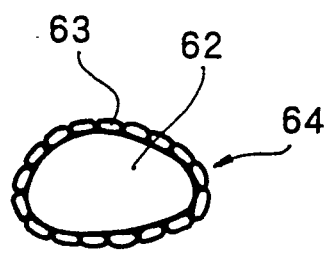
FIG. 17 schematically illustrates a capsule particle of the fifth embodiment in its cross section.
Figure 18:
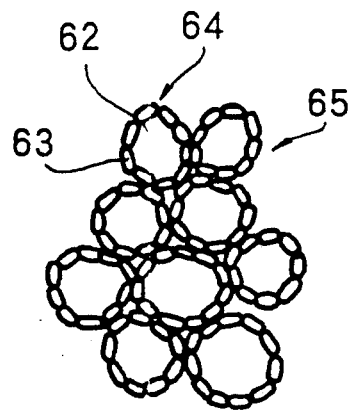
FIG. 18 shows a composite particle that is an agglomerate of the capsule particles of FIG. 17.
Figure 19:
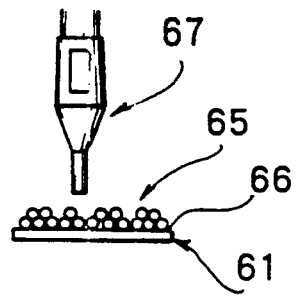
FIG. 19 illustrates a step of attaching the capsule particles of FIGS. 17 and 18 onto a material for the sheath member.

In the meantime, we manufacture the capsule particles 64 as in the foregoing embodiments. Namely, as shown in FIG. 17, we take a ceramic particle, e.g., $Al_2O_3$, SiC, $Si_3N_4$ and CuO as the core particle 62, and electrostatically attach Cu particles as the covering particles 63 thereto, the material of the covering particles being so selected as to be of the same kind as the sheath member 61. Then, we subject these particles to an appropriate impact force in the high speed gas stream using the hybridizer described above for 1 to 10 minutes or thereabout by, for example, making the rotator rotation speed to be 8,000 to 16,000 rpm, thereby producing capsule particles 64 and their agglomerates, the composite particles 65. Next, we place these composite particles 65 on a strip of the sheath member 61 and make them adhere thereto ultrasonically by activating a ultrasonic transducer 67 placed above the body of the composite particles 65. Then, we roll up the sheath member strip 61 in its width direction together with the composite particles 65 adhered thereto, with the surface 66 that carries the composite particles 65 inside, so as to finish in a cylinder a diameter 0.8 to 1.6 mm by, for example, folding the both edges 68 into the sheath member 61. Thus, produced is a wire 69 filled with the capsule particles 64. The weld cladding with this wire 69 can be done with a MIG welder shown in FIG. 8.

Here, it should be noted that since the sheath member 61 has been made by rolling itself up after the capsule particles 64 have been firmly adhered on its inner surface, instead of mechanically charging the capsule particles 64 into a pre-formed cylinder, there is no chance for the capsule particles 64 to flow around, which would make the distribution uneven. This aids greatly, together with the fact that additives are supplied in the form of capsule particles 64, in stabilizing and homogenizing the qualities of the molten metal layer. In addition, this construction makes it possible to realize any material combination among the core particle, the covering particle and the sheath member as desired: for example, the use of the heat resisting element such as Co, Mo and Cr for the core particle and Al for the covering particles and the sheath member is perfectly permissible.

Figure 20:
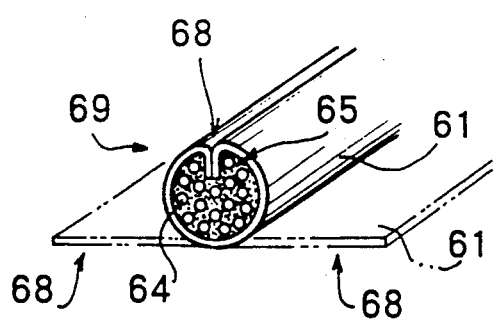
FIG. 20 illustrates a step of rolling up the sheath member.
Figure 21:
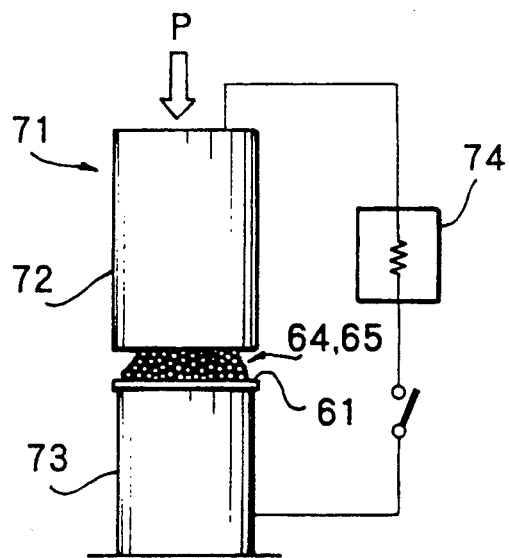
FIG. 21 illustrates in side view another embodiment of the step of FIG. 19.

Moreover, the composite particles 65 of the capsule particles 64 may be made to adhere onto the sheath member 61 by the ohmic resistance sintering method instead of the ultrasonic method described above. In this case, we use an ohmic resistance sintering apparatus 71 shown in FIG. 21 which comprises a pair of vertically opposing punch electrodes 72 and 73, a power source 74 and a hydraulic mechanism (not shown) whose duty is to apply a pressure P on the punch electrodes 72 and 73 as desired. The sheath member strip 61 that carries the capsule particles 64 (or the composite particles 65) on itself is placed between the pair of the punch electrodes 72 and 73, is made into a unified body on sintering the capsule particles 64 (or the composite particle 65) under pressure and by the discharge electric current. The sheath member strip 61 thus prepared can be rolled up into a wire as shown in FIG. 20.

Sixth Embodiment

In a sixth embodiment, we provide a wire for conducting weld cladding with a MIG welder in such a way as to effectively preclude the occurrence of inhomogeneous welding current due to unevenness in the thickness of the sheath member. That is to say, we composed a wire 85 from plural number of capsule particles 83, each made by encapsulating a core particle 81, which may be of a heat resisting element, with smaller covering particles 82, an electrically conductive sheath member 84 to be filled with the capsule particles 83, and a second wire 86 of a comparable electric resistance as the sheath member 84, inserted therein so as to be surrounded by the capsule particles 83. Here, the core particle 81 may be a ceramic (e.g., $Al_2O_3$, SiC, $Si_3N_4$ and CuO), the covering particles 82 and the sheath member 84, Cu, and the second wire 86, the same kind of Cu as the covering particles 82 and the sheath member 84. The outer diameter D of the wire 85 may be 0.8 to 1.6 mm or thereabout, while the diameter d of the second wire 86 should be about one tenth to one half of D, because when $d \leq 0.1D$, manufacturing becomes rather difficult, whereas when $d \geq 0.5D$, the second wire 86 becomes liable to touch upon the sheath member 84, spoiling the effects of the capsule particles 83.

We manufacture the wire 85 as shown in FIGS. 23 through 25 as follows: First, as shown in FIG. 23, we make a capsule particle 83 by encapsulating a ceramic core particle 81 of a diameter of 10 to 500 micrometers or thereabout, with the Cu covering particles 82 of a diameter of about one tenth thereof, or further make composite particles thereof shown in FIG. 24 as needed; in the meantime, we make a channel 84 from a Cu strip to ultimately become the sheath member, stretch a Cu wire as the second wire 86 through its cavity along its length, keeping an appropriate distance from its walls so that it will eventually be laid along the central axis 89 of the wire 85: we then charge the capsule particles 83 (or the composite particles made therefrom) into the channel 84, and roll the channel 84 as it is loaded with the capsule particles 83 into a fine wire 85 by turning the pairs of rolling dies-cum-pinch roller 87 and 88, producing the wire 85 inserted with a second wire 86 as its center.

In performing the weld cladding with the wire 85 thus formed by, for example, a cylinder head made of cast iron at its object locality, the MIG welder mentioned earlier may be used to form a molten metal layer containing a desired amount of Ceramic. Here, one effect of providing a Cu second wire 86 at the center of the wire 85, which is composed of a Cu sheath member 84 and plural number of capsule particles 84, made by encapsulating a ceramic core particle 81 with the smaller Cu covering particles 82, is to equalize the current distribution between the outer part of the wire 86, i.e., the sheath member 84, and the inner part thereof, i.e., the capsule particles 83, a beneficial effect which has been realized by preventing the welding current from flowing excessively through the sheath member 84, particularly in cases where the wall thickness of the sheath member 84 is large.

It is to be noted therefore that this effect, together with the provision of the capsule particles 83 which brings about equalization of the electric resistance along the length of the wire 85, ensures formation of weld claddings of uniform quality. In addition, these benefits are had for any material combination of the core particle 81, the covering particle 82, the sheath member 84 and the second wire 86: for example, the use of a heat resisting element such as Co, Mo and Cr for the core particle 81, and Al for the covering particle 82 and the sheath member 84, together with the use of any such material, not necessarily Al, which can develop either by nature or by size a comparable electric resistance as that of the covering particle 82 and the sheath member 84, for the second wire 86 is perfectly permissible.

Finally, even though considerable homogenization can be ensured in the distribution of the capsule particles 83 by appropriately controlling the capsule particle feeding rate and the roller feeding rate in the wire making method described above, the method described in the fifth embodiment as shown in FIG. 20 may will be used when excessive fluidity of the charged capsule particles 83 is feared.

We claim:

1. In a method of modifying qualities of materials at an object part, the method comprising the steps of:
   (A) preparing a sheath member:
   (B) making a capsule particle by encapsulating a core particle with covering particles, the covering particle being made from the same material as the sheath member is made from, the covering particle being made from a material that is compatible with the object part;
   (C) making a wire by filling the sheath member with the capsule particle; and
   (D) forming weld cladding on the object material.

2. The method of claim 1, wherein step (B) includes the steps of:
   electrostatically attaching on the surface of a particle which is to become a core, a plurality of covering particles of a diameter smaller than the core particle; and
   applying an impact force to the core particle and the covering particles by charging them into a high speed gas stream, thereby making covering particles firmly adhere to or penetrate into the core particle.

3. The method of claim 1, wherein step (C) includes the steps of:
   charging the capsule particles into the sheath member; and
   drawing the sheath member, filled with the capsule particles, to a predetermined diameter.

4. The method of claim 1, wherein step (D) is performed by a welding apparatus with the wire as the filler.

5. The method of claim 1, wherein step (D) is performed by a MIG welder with the wire as the consumable electrode.

6. The method of claim 1, wherein step (B) is performed without the use of a binder.

7. A wire to be used in a method of modifying qualities of an object part by means of a weld cladding method, comprising:
 a plurality of capsule particles, each made by encapsulating a core particle with smaller covering particles; and
 a sheath member to be filled with the capsule particles, the covering particle being made from the same material as the sheath member is made from, and the covering particle being made from a material that is compatible with the object part.

8. The wire of claim 7, wherein the covering particle and the sheath member are electric conductors, respectively.

9. The wire of claim 7, wherein the covering particle and the sheath member are made of the same kind of material as the object material.

10. The wire of claim 7, wherein the core particle is made of a heat resisting element and the covering particle and the sheath member are made of a metal, respectively.

11. The wire of claim 10, wherein the heat resisting element is selected from the group consisting of Co, Mo and Cr, and the metal is Cu.

12. The wire of claim 7, wherein the core particle is made of a heat resisting element and the covering particle and the sheath member are made of aluminum, respectively.

13. The wire of claim 12, wherein the heat resisting element is selected from the group consisting of Co, Mo and Cr.

14. The wire of claim 7, wherein the heat resisting element is either a heat resisting metal such as Co, Mo, Cr and Ni or a ceramic such as $Al_2O_3$, $Si_3N_4$, SiC and CuO.

15. The wire of claim 7, wherein the core particle is made of a metal and the covering particle and the sheath member are made of a polymer, respectively.

16. The wire of claim 15, wherein the volume ratio of the core particle is larger than the volume ratio of the covering particles in the capsule particle.

17. The wire of claim 15, wherein the polymer is a resin.

18. The wire of claim 7, wherein the core particle is made of a ceramic and the covering particle and the sheath member are made of a polymer, respectively.

19. The wire of claim 7, wherein the core particle is made of a rubber and the covering particle and the sheath member are made of a polymer, respectively.

20. The wire of claim 7, wherein a diameter of the covering particle is about one tenth of a diameter of the core particle.

21. The wire of claim 7, wherein an outer diameter of the wire is between 0.8 mm and 1.6 mm.

22. The wire of claim 7, wherein a weight ratio of the covering particle to the core particle is 30 to 70.

23. The wire of claim 7, wherein a diameter of the core particle is approximately between 10 micrometers and 500 micrometers.

24. The wire of claim 7, wherein each capsule is devoid of a binder.

25. In a method of manufacturing a material modification wire, the method comprising the steps of:
 (A) rendering a material for a sheath member into a strip-like flat form;
 (B) making a capsule particle by encapsulating a core particle made of a heat resisting element with smaller covering particles, the covering particle being made from the same material as the sheath member is made from, the covering particle being made from a material that is compatible with the material to be modified;
 (C) attaching the capsule particle on a surface of material for the sheath member which is to become an inside surface thereof; and
 (D) rolling up the material for the sheath member, carrying the capsule particles on itself, into a fine wire.

26. The method of claim 25, wherein step (C) is performed using ultrasonic vibration energy generated by an ultrasonic transducer.

27. The method of claim 25, wherein step (C) is performed using ohmic resistance heat generated by an ohmic resistance sintering apparatus.

28. A wire to be used in a method of modifying qualities of materials at their local parts by means of weld cladding method using a MIG welder or the like, comprising:
 a first wire, the first wire including a plurality of capsule particles, each made by encapsulating a core particle made of a heat resisting element with smaller covering particles and an electrically conductive sheath member to be filled with the capsule particles; and
 a second wire having an electric resistance equivalent to that of the sheath member placed within the first wire so as to be surrounded by the capsule particles.
 the covering particle and the sheath member being made of a material that is compatible with the object base material and the second wire being made of the same kind of material as the covering particle and the sheath member.

29. The wire of claim 28 wherein the second wire and the sheath member are made of copper, respectively.

30. The wire of claim 28, wherein the second wire is laid along a center axis of the first wire.

31. The wire of claim 28, wherein the diameter of the second wire is one tenth to one half of an outer diameter of the first wire.

* * * * *

UNITED STATES PATENT AND TRADEMARK OFFICE
CERTIFICATE OF CORRECTION

PATENT NO. : 5,260,540
DATED : Nov. 9, 1993
INVENTOR(S) : Tadashi Kamimura and Tadashi Tsujimura It is certified that error appears in the above-identified patent and that said Letters Patent is hereby corrected as shown below:

On the cover page of the patent after "[22] Filed: Jan. 25, 1991", please insert the following:

--[30]  Foreign Application Priority Data

Jan. 26, 1990 [JP]  Japan.................... 2-15018
    Jan. 26, 1990 [JP]  Japan.................... 2-15019
    Apr. 10, 1990 [JP]  Japan.................... 2-92996
    Sep. 21, 1990 [JP]  Japan.................... 2-250055
    Sep. 25, 1990 [JP]  Japan.................... 2-251737--.

Signed and Sealed this

Twenty-first Day of June, 1994

*Attest:*

BRUCE LEHMAN

*Attesting Officer*     *Commissioner of Patents and Trademarks*